US012493312B2

(12) United States Patent
Feng et al.

(10) Patent No.: US 12,493,312 B2
(45) Date of Patent: Dec. 9, 2025

(54) LOW-DROPOUT REGULATOR WITH NOISE CANCELLATION AND OPERATION METHOD THEREOF

(71) Applicant: Realtek Semiconductor Corporation, Hsinchu (TW)

(72) Inventors: Yi Feng, Hsinchu (TW); Hsueh-Yu Kao, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 255 days.

(21) Appl. No.: 18/317,107

(22) Filed: May 15, 2023

(65) Prior Publication Data

US 2023/0409065 A1 Dec. 21, 2023

(30) Foreign Application Priority Data

Jun. 15, 2022 (TW) ................................. 111122303

(51) Int. Cl.
*G05F 1/59* (2006.01)
*G05F 1/46* (2006.01)
*G05F 1/575* (2006.01)

(52) U.S. Cl.
CPC ................ *G05F 1/59* (2013.01); *G05F 1/468* (2013.01); *G05F 1/575* (2013.01)

(58) Field of Classification Search
CPC ............. G05F 1/468; G05F 1/575; G05F 1/59
See application file for complete search history.

(56) References Cited

U.S. PATENT DOCUMENTS

| | | | | |
|---|---|---|---|---|
| 8,760,133 B2 * | 6/2014 | Hasegawa | G05F 1/575 | 323/280 |
| 10,185,344 B1 | 1/2019 | Kadanka | | |
| 10,281,943 B1 * | 5/2019 | Ho | G05F 1/575 | |
| 11,474,551 B1 * | 10/2022 | Tan | G05F 1/565 | |
| 2015/0220094 A1 * | 8/2015 | Ho | G05F 1/618 | 323/280 |
| 2021/0021270 A1 | 1/2021 | Zhan et al. | | |
| 2022/0103142 A1 * | 3/2022 | Gruber | H03F 3/45183 | |

(Continued)

OTHER PUBLICATIONS

G. Cai, Y. Lu, C. Zhan and R. P. Martins, Rejection,"A Fully Integrated FVF LDO With Enhanced Full-Spectrum Power Supply Rejection," in IEEE Transactions on Power Electronics, vol. 36, No. 4, pp. 4326-4337, Apr. 2021, doi: 10.1109/TPEL.2020.3024595.

*Primary Examiner* — Jue Zhang
*Assistant Examiner* — Lakaisha Jackson
(74) *Attorney, Agent, or Firm* — CKC & Partners Co., LLC

(57) ABSTRACT

A low-dropout regulator includes an amplifier circuit, a buffer circuit, a control circuit, a power transistor, and a feedback circuit. The amplifier circuit is configured to operate based on an input voltage and generate a first voltage at a first node according to a reference voltage and a feedback voltage. The buffer circuit is configured to generate a second voltage at a second node according to the first voltage. The control circuit is configured to work with the buffer circuit to form a noise canceller. The noise canceller is coupled between the first node, the second node, and a voltage terminal. The power transistor is configured to generate an output voltage according to the input voltage and the second voltage. The feedback circuit is configured to generate the feedback voltage according to the output voltage.

20 Claims, 7 Drawing Sheets

(56) References Cited

U.S. PATENT DOCUMENTS

| | | | | |
|---|---|---|---|---|
| 2023/0236615 | A1* | 7/2023 | Pang | G05F 1/575<br>323/273 |
| 2024/0004412 | A1* | 1/2024 | Zhang | G05F 1/59 |
| 2024/0126313 | A1* | 4/2024 | Ku | G05F 1/575 |

* cited by examiner

| frequency (Hz) | power supply rejection ratio (dB) | |
|---|---|---|
| | curve A | curve B |
| 10k | -49.2 | -51.4 |
| 100k | -46.6 | -47.8 |
| 1M | -40.6 | -48.7 |
| 2M | -34.9 | -37.9 |
| 80M | -23.3 | -24.5 |
| 160M | -24.3 | -26.5 |

FIG. 3

LOW-DROPOUT REGULATOR WITH NOISE CANCELLATION AND OPERATION METHOD THEREOF

RELATED APPLICATIONS

This application claims priority to Taiwanese Application Serial Number 111122303, filed Jun. 15, 2022, which is herein incorporated by reference.

BACKGROUND

Technical Field

The present disclosure relates to technology of a low-dropout regulator (LDO). More particularly, the present disclosure relates to a low-dropout regulator and an operation method thereof with improved power supply rejection ratio (PSRR).

Description of Related Art

With developments of technology, various integrated circuits have been developed. However, there is still room for improving the performance of many integrated circuits.

For example, in some related approaches, in order to improve the power supply rejection ratio of the low-dropout regulator, it needs to dispose a voltage regulator capacitor in the low-dropout regulator. However, the voltage regulator capacitor occupies a large area. In addition, in some related approaches, it needs to utilize additional circuits to compensate for power supply rejection ratio. However, the additional circuits may cause overall power consumption to increase, and even lead to latch-up problems.

SUMMARY

Some aspects of the present disclosure are to provide a low-dropout regulator. The low-dropout regulator includes an amplifier circuit, a buffer circuit, a control circuit, a power transistor, and a feedback circuit. The amplifier circuit is configured to operate based on an input voltage and generate a first voltage at a first node according to a reference voltage and a feedback voltage. The buffer circuit is configured to generate a second voltage at a second node according to the first voltage. The control circuit is configured to work with the buffer circuit to form a noise canceller. The noise canceller is coupled between the first node, the second node, and a voltage terminal. The power transistor is configured to generate an output voltage according to the input voltage and the second voltage. The feedback circuit is configured to generate the feedback voltage according to the output voltage.

Some aspects of the present disclosure are to provide a low-dropout regulator. The low-dropout regulator includes an amplifier circuit, a buffer circuit, a noise cancelling circuit, a power transistor, and a feedback circuit. The amplifier circuit is configured to operate based on an input voltage and generate a first voltage at a first node according to a reference voltage and a feedback voltage. The buffer circuit is configured to generate a second voltage at a second node according to the first voltage. The noise cancelling circuit is coupled between the first node, the second node, and a voltage terminal. The power transistor is configured to generate an output voltage according to the input voltage and the second voltage. The feedback circuit is configured to generate the feedback voltage according to the output voltage.

Some aspects of the present disclosure are to provide an operation method of a low-dropout regulator. The operation method includes following operations: operating, by an amplifier circuit, based on an input voltage, and generating, by the amplifier circuit, a first voltage at a first node according a reference voltage and a feedback voltage; generating, by a buffer circuit, a second voltage at a second node according to the first voltage; controlling, by a control circuit, the buffer circuit to control the second voltage or controlling, by a noise cancelling circuit, the second voltage; generating, by a power transistor, an output voltage according to the input voltage and the second voltage; and generating, by a feedback circuit, the feedback voltage according to the output voltage.

As described above, in the present disclosure, the buffer circuit is disposed in the low-dropout regulator to form the noise canceller, or the noise cancelling circuit is disposed in the low-dropout regulator so as to improve the power supply rejection ratio of the low-dropout regulator.

BRIEF DESCRIPTION OF THE DRAWINGS

The disclosure can be more fully understood by reading the following detailed description of the embodiment, with reference made to the accompanying drawings as follows:

FIG. 3 is a schematic diagram of a plurality of sample points in FIG. 2 according to some embodiments of the present disclosure.

DETAILED DESCRIPTION

In the present disclosure, "connected" or "coupled" may refer to "electrically connected" or "electrically coupled." "Connected" or "coupled" may also refer to operations or actions between two or more elements.

Figure 1:
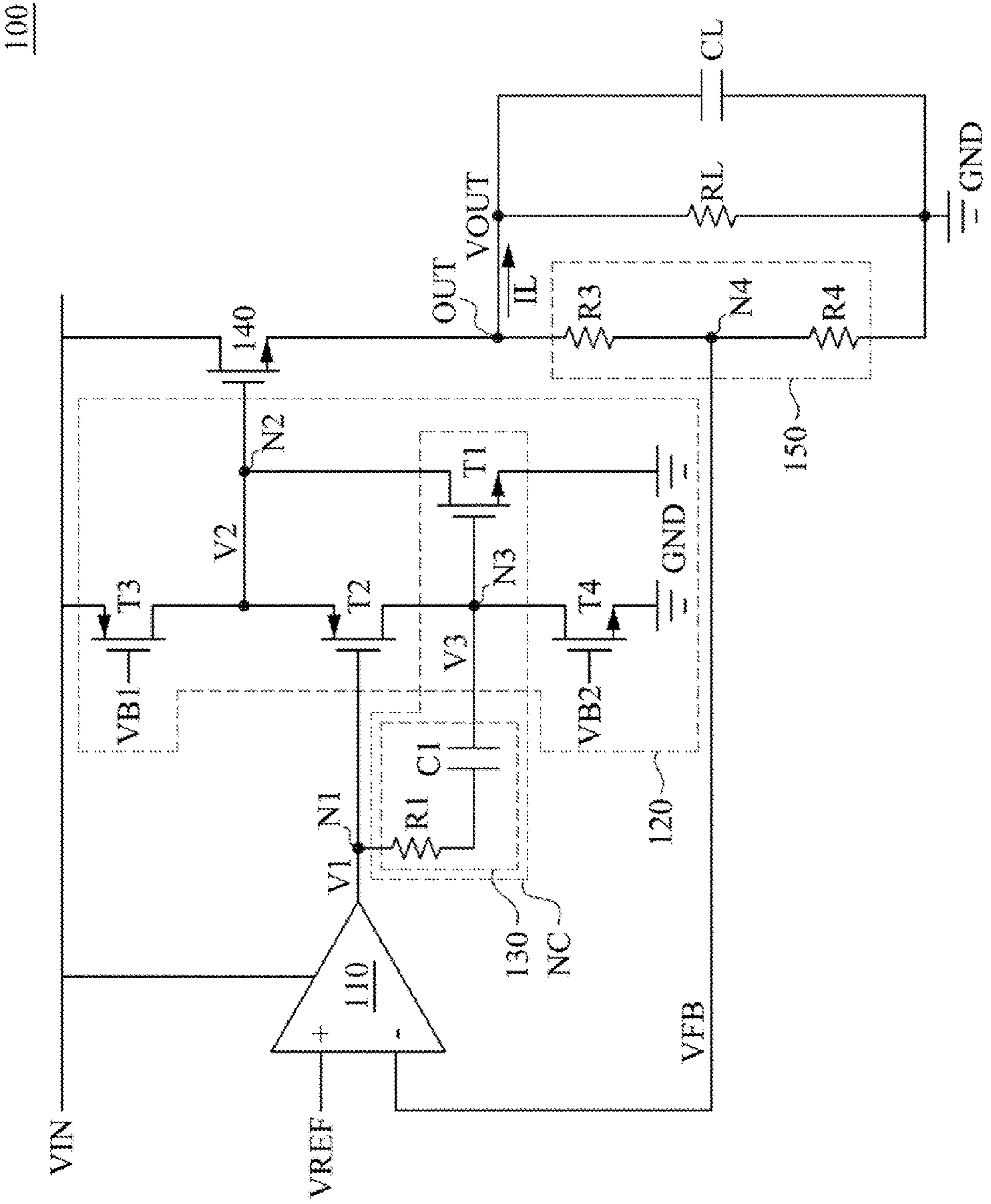
FIG. 1 is a schematic diagram of a low-dropout regulator according to some embodiments of the present disclosure.

Reference is made to FIG. 1. FIG. 1 is a schematic diagram of a low-dropout regulator 100 according to some embodiments of the present disclosure.

As illustrated in FIG. 1, the low-dropout regulator 100 includes an amplifier circuit 110, a buffer circuit 120, a control circuit 130, a power transistor 140, and a feedback circuit 150.

The amplifier circuit 110 operates based on an input voltage VIN, and generates a voltage V1 at a node N1 according to a reference voltage VREF and a feedback voltage VFB. As illustrated in FIG. 1, the amplifier circuit 110 can be implemented by an analog error amplifier. The amplifier circuit 110 operates based on the input voltage VIN and operates according to the reference voltage VREF and the feedback voltage VFB. The input voltage VIN can be, for example, 3.3 volts, but the present disclosure is not limited thereto. The amplifier circuit 110 includes a positive input terminal, a negative input terminal, and an output terminal. The positive input terminal of the amplifier circuit 110 receives the reference voltage VREF, the negative input terminal of the amplifier circuit 110 receives the feedback voltage VFB from the feedback circuit 150, and the amplifier circuit 110 generates the voltage V1 at its output terminal (i.e., the node N1).

The buffer circuit 120 generates a voltage V2 at a node N2 according to the voltage V1. As illustrated in FIG. 1, the buffer circuit 120 can be implemented by a super source follower (SSF). To be more specific, the buffer circuit 120 includes transistors T1-T4. The transistor T1 and the transistor T4 are N-type transistors. The transistor T2 and the transistor T3 are P-type transistors. The transistor T1 is coupled between the node N2 and a ground terminal GND, and the resistance of transistor T1 is adjusted by a voltage V3 at a node N3. The transistor T2 is coupled between the node N2 and the node N3 (i.e., coupled between the transistor T3 and the transistor T4) and is controlled by the voltage V1 to make the voltage V2 equal to the voltage V1 plus the gate-source voltage of the transistor T2. A first terminal of the transistor T3 receives the input voltage VIN, a second terminal of the transistor T3 is coupled to the node N2, and a control terminal of the transistor T3 is controlled by a bias voltage VB1 to be a current source. The transistor T4 is coupled between the node N3 and the ground terminal GND and is controlled by a bias voltage VB2 to be a current source.

The control circuit 130 and the buffer circuit 120 form a noise canceller NC. As illustrated in FIG. 1, the control circuit 130 includes a resistor R1 and a capacitor C1. A first terminal of the resistor R1 is coupled to the node N1, a second terminal of the resistor R1 is coupled to a first terminal of the capacitor C1, and a second terminal of the capacitor C1 is coupled to the node N3. The resistor R1, the capacitor C1, and the transistor T1 can form the noise canceller NC. The noise canceller NC is coupled between the node N1, the node N2, and a voltage terminal (in FIG. 1, the voltage terminal is the ground terminal GND). In some other embodiments, when the transistor T1 is implemented by a P-type transistor, the aforementioned voltage terminal can be configured to receive a fixed power voltage. In addition, in some other embodiments, the resistor R1 and the capacitor C1 can be replaced by one capacitor.

The power transistor 140 generates an output voltage VOUT according to the input voltage VIN and the voltage V2. As illustrated in FIG. 1, the power transistor 140 is an N-type transistor, but the present disclosure is not limited thereto. A first terminal of the power transistor 140 receives the input voltage VIN, and a control terminal of the power transistor 140 receives the voltage V2, and the resistance of power transistor 140 is adjusted by the voltage V2 such that the output voltage VOUT is generated at a second terminal of the power transistor 140 (i.e., an output terminal OUT of the low-dropout regulator 100). In some embodiments, the power transistor 140 is a power metal-oxide-semiconductor field-effect transistor (power MOSFET).

The feedback circuit 150 generates the feedback voltage VFB according to the output voltage VOUT. As illustrated in FIG. 1, the feedback circuit 150 includes a resistor R3 and a resistor R4. A first terminal of the resistor R3 is coupled to the output terminal OUT, a second terminal of the resistor R3 is coupled to a first terminal of the resistor R4, and a second terminal of the resistor R4 is coupled to the ground terminal GND. The resistor R3 and the resistor R4 form a voltage divider circuit. According to the output voltage VOUT and resistance values of the resistor R3 and the resistor R4, the feedback voltage VFB is generated at a node N4 between the resistor R3 and the resistor R4.

In addition, FIG. 1 illustrates a load resistor RL and a load capacitor CL. The load resistor RL and the load capacitor CL is contributed by a load coupled to the output terminal OUT.

In some related approaches, the output voltage of the amplifier circuit is directly transmitted to the control terminal of the power transistor. However, with this configuration, the output voltage of the amplifier circuit directly affects the overall gain of the low-dropout regulator and the gain of the amplifier circuit, and this even leads to an accuracy problem.

Compared to the aforementioned approaches, the transistor T2 in the buffer circuit 120 of the present disclosure can separate the voltage V1 outputted from the amplifier circuit 110 and the voltage V2 outputted from the buffer circuit 120. In other words, the voltage V1 outputted from the amplifier circuit 110 can be different from the voltage V2 outputted from the buffer circuit 120. In general, the voltage V2 can be higher than the voltage V1 (e.g., the voltage V2 is higher than the voltage V1 by one gate-source voltage). With this configuration, the overall gain of the low-dropout regulator 100 and the gain of the amplifier circuit 110 is less likely affected. Thus, the output voltage VOUT of the low-dropout regulator 100 can be locked at a target voltage more precisely.

In addition, due to the buffer circuit 120, the voltage headroom of the voltage V2 can be increased such that a voltage difference between the voltage V2 and the output voltage VOUT can be greater. Thus, the size (e.g., width-length ratio) of the power transistor 140 can be smaller with the same current. When channel lengths of two transistors are identical, the smaller transistor has a smaller channel width.

However, in an architecture with the buffer circuit 120 but without the control circuit 130, it is assumed that there is other noise in the input voltage VIN and the input voltage VIN and the noise have positive voltages. In this situation, the noise causes the voltage V1 outputted from the amplifier circuit 110 to increase. When the voltage V1 increases, the conductance of the transistor T2 becomes smaller. When the conductance of the transistor T2 is smaller, the voltage V2 outputted from the buffer circuit 120 is pulled up by the input voltage VIN through the transistor T3. When the voltage V2 increases, the conductance of the power transistor 140 becomes larger. Thus, more noise in the input voltage VIN is transmitted to the output terminal OUT through the power transistor 140. This causes the power supply rejection ratio of the low-dropout regulator 100 to be worse.

In some related approaches, for improving the power supply rejection ratio of the low-dropout regulator, a voltage regulator capacitor is added into the low-dropout regulator. However, the voltage regulator capacitor occupies a large area. In addition, in some related approaches, additional circuits are utilized to compensate for the power supply rejection ratio. However, the additional circuits causes overall power consumption to increase, and even lead to latch-up problems.

Compared to the aforementioned approaches, the noise canceller NC of the present disclosure can provide a noise cancellation path. As described above, if there is other noise in the input voltage VIN, the noise causes the voltage V1 to increase. When the voltage V1 increases, the voltage V3 at the node N3 increases due to the noise cancellation path of the noise canceller NC. When the voltage V3 increases, the conductance of the transistor T1 becomes larger. When the conductance of the transistor T1 is larger, the voltage V2 is pulled down by the ground terminal GND through the transistor T1. Accordingly, the force that the voltage V2 is pulled up by the noise of the input voltage VIN is cancelled by the force that the voltage V2 is pulled down by the ground terminal GND, such that the conductance of the power transistor 140 is not too large. Thus, it can prevent excessive noise from being transmitted to the output terminal OUT through the power transistor 140 to improve the power supply rejection ratio of the low-dropout regulator 100.

Figure 2:
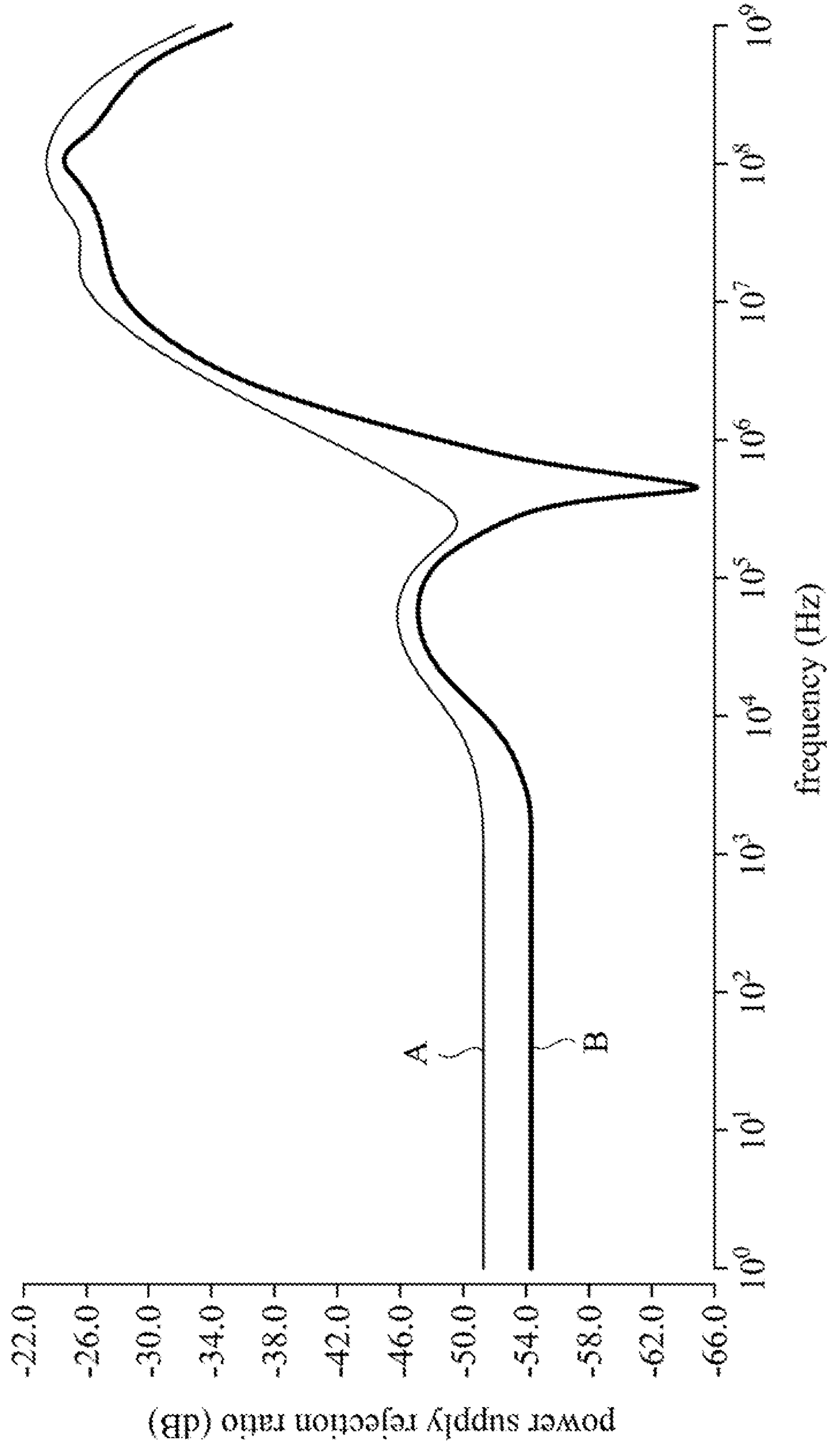
FIG. 2 is a schematic diagram of relationship between noise frequencies and power supply rejection ratios according to some embodiments of the present disclosure.

Reference is made to FIG. 2. FIG. 2 is a schematic diagram of relationship between noise frequencies and power supply rejection ratios according to some embodiments of the present disclosure.

The horizontal axis in FIG. 2 is the frequencies of applied noise and its unit is hertz (Hz), and the vertical axis in FIG. 2 is the power supply rejection ratios and its unit is decibel (dB). In FIG. 2, the power supply rejection ratio is a decibel value corresponding a ratio between the variation of the output voltage VOUT and the variation of the input voltage VIN (when the decibel value is less, the power supply rejection ratio is better).

The curve A in FIG. 2 corresponds to a low-dropout regulator in some related approaches, and the curve B in FIG. 2 corresponds to the low-dropout regulator 100 of the present disclosure.

As illustrated in FIG. 2, no matter which portion of the frequency, the power supply rejection ratio of the curve B is better than the power supply rejection ratio of the curve A. In the mid-low frequency portion, the improvement of the power supply rejection ratio is mainly due to the noise cancellation path of the noise canceller NC. In the high frequency portion, the improvement of the power supply rejection ratio is mainly due to the buffer circuit 120. As described above, the buffer circuit 120 can increase the voltage headroom of the voltage V2 such that the size of the power transistor 140 can be smaller so as to improve the power supply rejection ratio of the high frequency portion.

References are made to FIG. 2 and FIG. 3. FIG. 3 is a schematic diagram of a plurality of sample points in FIG. 2 according to some embodiments of the present disclosure.

In FIG. 3, the power supply rejection ratios corresponding to the noise frequencies 10 kHz, 100 kHz, 1 megaHz, 2 megaHz, 80 megaHz, and 160 megaHz of the curve B are better than the power supply rejection ratios corresponding to the noise frequencies 10 kHz, 100 kHz, 1 megaHz, 2 megaHz, 80 megaHz, and 160 megaHz of the curve A respectively.

Figure 4:
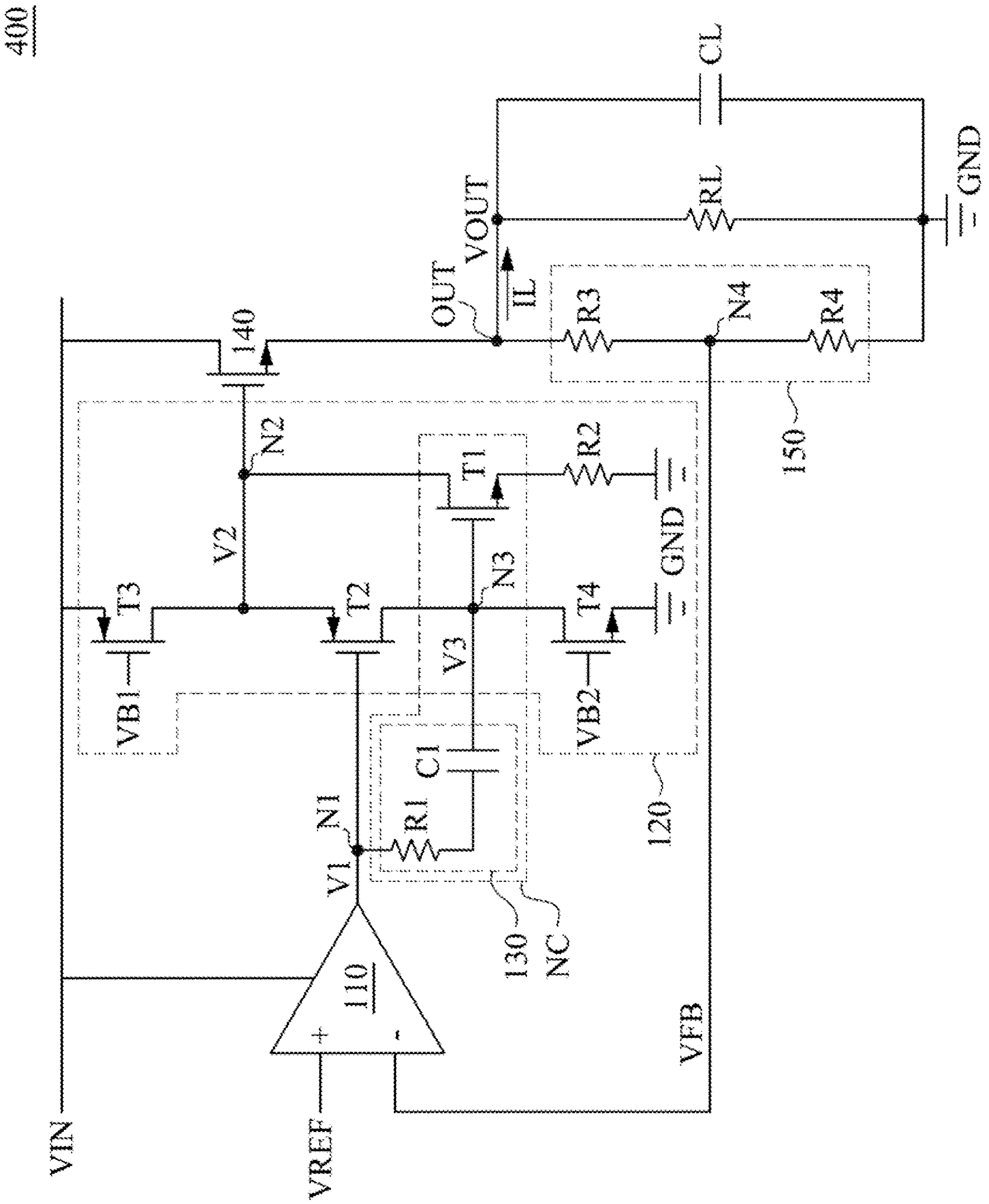
FIG. 4 is a schematic diagram of a low-dropout regulator according to some embodiments of the present disclosure.

Reference is made to FIG. 4. FIG. 4 is a schematic diagram of a low-dropout regulator 400 according to some embodiments of the present disclosure.

The major difference between FIG. 4 and FIG. 1 is that the low-dropout regulator 400 in FIG. 4 further includes a resistor R2. The resistor R2 is coupled between the transistor T1 and the ground terminal GND.

Figure 5:
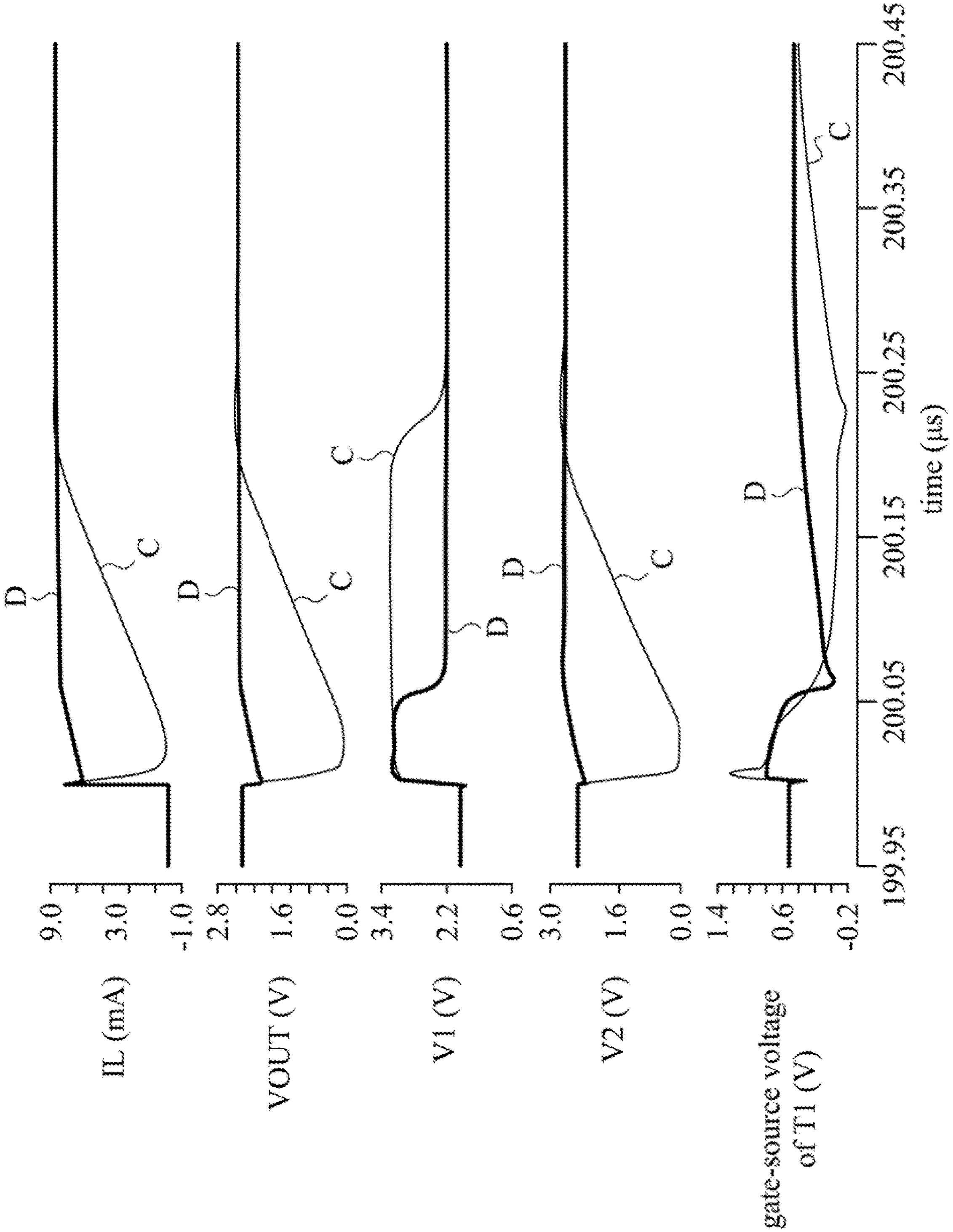
FIG. 5 is a waveform diagram of signals of two low-dropout regulators according to some embodiments of the present disclosure.

Reference is made to FIG. 5. FIG. 5 is a waveform diagram of signals of the low-dropout regulators 100 and 400 according to some embodiments of the present disclosure.

The curves C in FIG. 5 are some signals of the low-dropout regulator 100, and the curves D in FIG. 5 are some signals of the low-dropout regulator 400.

The horizontal axis in FIG. 5 is time and its unit is micro-seconds (μs). FIG. 5 illustrates the load current IL, the output voltage VOUT, the voltage V1, the voltage V2, and the gate-source voltage of the transistor T1, in which the vertical unit of the load current IL is milliampere (mA) and other vertical units are volt (V).

As illustrated in the curves C in FIG. 1 and FIG. 5, when the load current IL increases, the voltage V1 increases to compensate the current such that the output voltage VOUT decreases. However, when the voltage V1 increases, the voltage V3 also increases. Thus, the conductance of the transistor T1 becomes larger. When the conductance of the transistor T1 is larger, it increases the force that the voltage V2 is pulled down by the ground terminal GND is stronger. Thus, the compensation ability becomes weaker.

Compared to FIG. 1, FIG. 4 is a source degeneration architecture. To be more specific, the resistor R2 in FIG. 4 can limit the current following through the transistor T1 such that the voltage V2 is not pulled down by the ground terminal GND too much (as the curve D corresponding to the voltage V2 in FIG. 5) to shorten the settling time.

Figure 6:
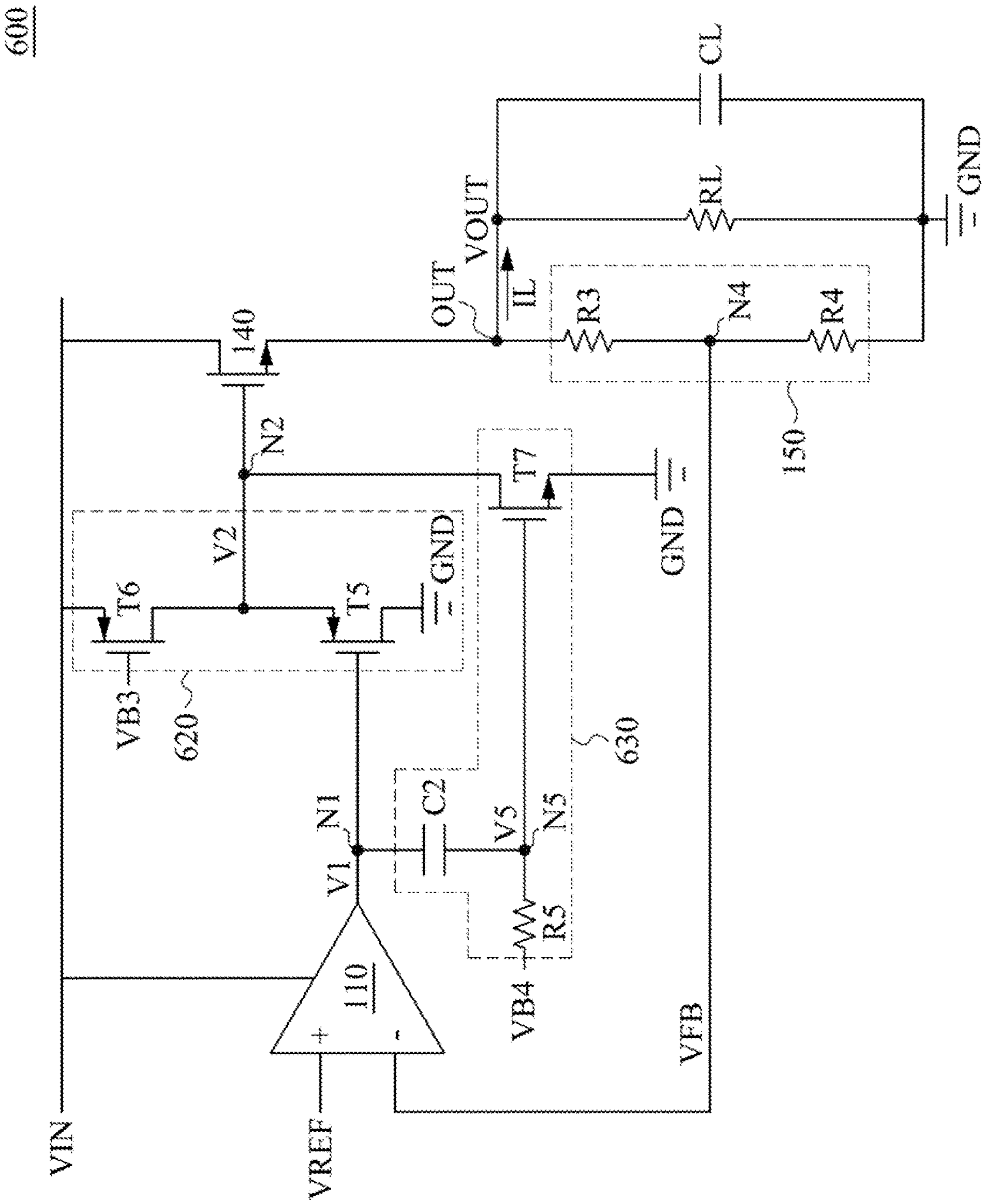
FIG. 6 is a schematic diagram of a low-dropout regulator according to some embodiments of the present disclosure.

Reference is made to FIG. 6. FIG. 6 is a schematic diagram of a low-dropout regulator 600 according to some embodiments of the present disclosure.

Major differences between the low-dropout regulator 600 in FIG. 6 and the low-dropout regulator 100 in FIG. 1 are described in following paragraphs.

As illustrated in FIG. 6, a buffer circuit 620 can be implemented by a source follower. To be more specific, the buffer circuit 620 includes a transistor T5 and a transistor T6. The transistor T5 and the transistor T6 are P-type transistors. The transistor T5 is coupled between the node N2 and the ground terminal GND and is controlled by the voltage V1 to make the voltage V2 equal to the voltage V1 plus the gate-source voltage of the transistor T5. A first terminal of the transistor T6 receives the input voltage VIN, a second terminal of the transistor T6 is coupled to the node N2, and a control terminal of the transistor T6 is controlled by a bias voltage VB3 to be a current source.

In addition, the low-dropout regulator 600 includes a noise cancelling circuit 630. The noise cancelling circuit 630 is coupled between the node N1, the node N2, and a voltage terminal (in FIG. 6, the voltage terminal is the ground terminal GND and is configured to receive the ground voltage). In some other embodiments, when the transistor T7 is a P-type transistor, the aforementioned voltage terminal can be configured to receive a fixed power voltage. As illustrated in FIG. 6, the noise cancelling circuit 630 includes a capacitor C2, a resistor R5, and a transistor T7. The capacitor C2 is coupled between the node N1 and a node N5. A first terminal of the resistor R5 receives a bias voltage VB4, and a second terminal of the resistor R5 is coupled to the node N5. A first terminal of the transistor T7 is coupled to the node N2, a second terminal of the transistor T7 is coupled to the ground terminal GND, and a control terminal of the transistor T7 is controlled by a voltage V5 at the node N5 to adjust the resistance of transistor T7. In some other embodiments, the capacitor C2 and the resistor R5 can be replaced by one capacitor.

Similar to FIG. 1, the transistor T5 in the buffer circuit 620 can separate the voltage V1 outputted from the amplifier circuit 110 and the voltage V2 outputted from the buffer circuit 620. In this configuration, the overall gain of the low-dropout regulator 600 and the gain of the amplifier circuit 110 is less likely affected. Thus, the output voltage VOUT of the low-dropout regulator 600 can be locked at a target voltage more precisely.

In addition, due to the buffer circuit 620, the voltage headroom of the voltage V2 can be increased such that the size of the power transistor 140 can be smaller.

In addition, the noise cancelling circuit 630 can provide a noise cancellation path. When the voltage V1 increases due to the noise in the input voltage VIN, the voltage V5 at the node N5 also increases. When the voltage V5 increases, the conductance of the transistor T7 becomes larger. When the conductance of the transistor T7 is larger, the voltage V2 is pulled down by the ground terminal GND through the transistor T7. Accordingly, the force that the voltage V2 is pulled up by the noise of the input voltage VIN can be cancelled by the force that the voltage V2 is pulled down by the ground terminal GND such that the conductance of the power transistor 140 is not too large. Thus, it can prevent excessive noise from being transmitted to the output terminal OUT through the power transistor 140 so as to improve the power supply rejection ratio of the low-dropout regulator 600.

Figure 7:
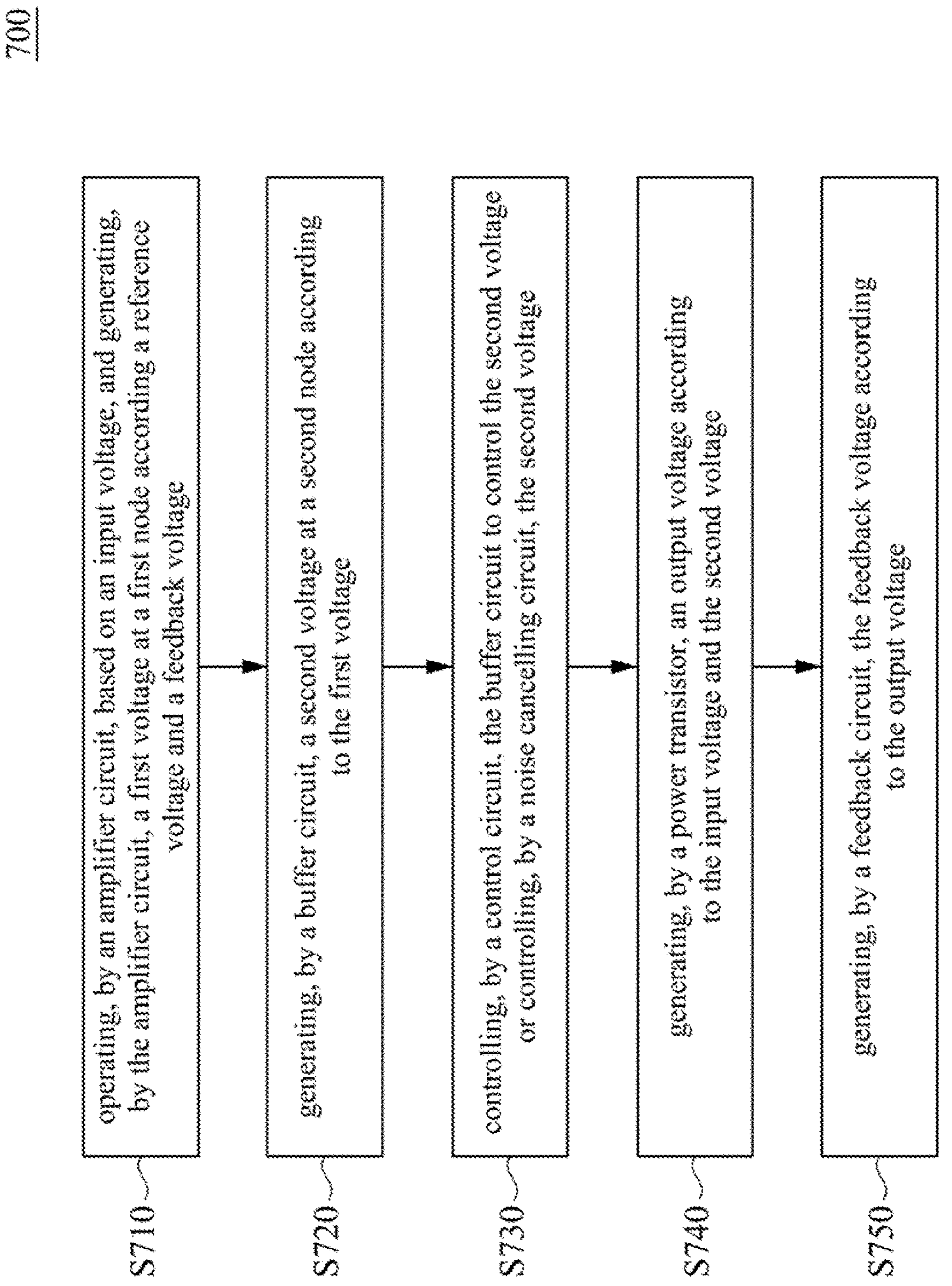
FIG. 7 is a flow diagram of an operation method according to some embodiments of the present disclosure.

Reference is made to FIG. 7. FIG. 7 is a flow diagram of an operation method 700 according to some embodiments of the present disclosure.

In some embodiments, the operation method 700 can be applied to the low-dropout regulator 100 in FIG. 1, the low-dropout regulator 400 in FIG. 4, or the low-dropout regulator 600 in FIG. 6. For better understanding, following paragraphs are described with the low-dropout regulator 100 in FIG. 1 and the low-dropout regulator 600 in FIG. 6.

As illustrated in FIG. 7, the operation method 700 includes operation S710, operation S720, operation S730, operation S740, and operation S750.

In operation S710, the amplifier circuit 110 operates based on the input voltage VIN and generates the voltage V1 at the node N1 according to the reference voltage VREF and the feedback voltage VFB. In some embodiments, the amplifier circuit 110 has a gain, and the amplifier circuit 110 can generates the voltage V1 according to this gain, the reference voltage VREF, and the feedback voltage VFB.

In operation S720, the buffer circuit 120 or the buffer circuit 620 generates the voltage V2 at the node N2 according to the voltage V1. In the example of FIG. 1, the buffer circuit 120 is the super source follower and includes four transistors T1-T4. In the example of FIG. 6, the buffer circuit 620 is the source follower and includes two transistors T5-T6.

In operation S730, the control circuit 130 controls the buffer circuit 120 to control the voltage V2 or the noise cancelling circuit 630 controls the voltage V2. In the example of FIG. 1 (the buffer circuit 120 is the super source follower), the control circuit 130 can control the transistor T1 in the super source follower to control the voltage V2 at the node N2. In the example of FIG. 6 (the buffer circuit 620 is the source follower), the noise cancelling circuit 630 can directly control the voltage V2 at the node N2.

In operation S740, the power transistor 140 generates the output voltage VOUT according to the input voltage VIN and the voltage V2. As illustrated in FIG. 1 and FIG. 6, the first terminal of the power transistor 140 receives the input voltage VIN, the control terminal of the power transistor 140 receives the voltage V2, and the second terminal of the power transistor 140 generates the output voltage VOUT.

In operation S750, the feedback circuit 150 generates the feedback voltage VFB according to the output voltage VOUT. As illustrated in FIG. 1 and FIG. 6, the relationship between the feedback voltage VFB and the output voltage VOUT as formula (1) below $$VFB = \text{VOUT} \times \frac{r4}{r3 + r4} \quad (1)$$

in which r3 is a resistance value of the resistor R3, and r4 is a resistance value of the resistor R4.

As described above, in the present disclosure, the buffer circuit is disposed in the low-dropout regulator to form the noise canceller, or the noise cancelling circuit is disposed in the low-dropout regulator so as to improve the power supply rejection ratio of the low-dropout regulator.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A low-dropout regulator, comprising:

an amplifier circuit configured to operate based on an input voltage, and configured to generate a first voltage at a first node according to a reference voltage and a feedback voltage;

a buffer circuit configured to generate a second voltage at a second node according to the first voltage;

a control circuit configured to work with the buffer circuit to form a noise canceller, wherein the noise canceller is coupled between the first node, the second node, and a voltage terminal;

a power transistor configured to generate an output voltage according to the input voltage and the second voltage; and a feedback circuit configured to generate the feedback voltage according to the output voltage, wherein the buffer circuit comprises a first transistor and the control circuit comprises a capacitor, wherein the capacitor is coupled to a gate terminal of the first transistor to form the noise canceller.

2. The low-dropout regulator of claim 1, wherein the capacitor is coupled between the first node and a third node, wherein the first transistor is coupled between the second node and the voltage terminal and is controlled by a third voltage at the third node.

3. The low-dropout regulator of claim 2, wherein the control circuit further comprises:

a first resistor coupled between the first node and the capacitor, wherein the first resistor, the capacitor, and the first transistor form the noise canceller.

4. The low-dropout regulator of claim 3, wherein the buffer circuit comprises:

a second transistor coupled between the second node and the third node, and controlled by the first voltage.

5. The low-dropout regulator of claim 4, wherein the buffer circuit further comprises:

a third transistor configured to receive the input voltage and controlled by a first bias voltage; and a fourth transistor coupled to the voltage terminal and controlled by a second bias voltage, wherein the second transistor is coupled between the third transistor and the fourth transistor.

6. The low-dropout regulator of claim 3, further comprising:

a second resistor coupled between the first transistor and the voltage terminal.

7. The low-dropout regulator of claim 1, wherein the buffer circuit is a super source follower.

8. A low-dropout regulator, comprising:

an amplifier circuit configured to operate based on an input voltage, and configured to generate a first voltage at a first node according to a reference voltage and a feedback voltage;

a buffer circuit configured to generate a second voltage at a second node according to the first voltage;

a noise cancelling circuit coupled between the first node, the second node, and a voltage terminal;

a power transistor configured to generate an output voltage according to the input voltage and the second voltage; and a feedback circuit configured to generate the feedback voltage according to the output voltage, wherein the noise cancelling circuit comprises:

a capacitor coupled between the first node and a third node; and a first transistor coupled between the second node, the third node, and the voltage terminal.

9. The low-dropout regulator of claim 8, wherein the noise cancelling circuit further comprises:

a resistor configured to receive a first bias voltage and coupled to the third node.

10. The low-dropout regulator of claim 9, wherein the buffer circuit comprises:

a second transistor coupled between the second node and the voltage terminal, and controlled by the first voltage.

11. The low-dropout regulator of claim 10, wherein the buffer circuit further comprises:

a third transistor configured to receive the input voltage, coupled to the second node, and controlled by a second bias voltage.

12. The low-dropout regulator of claim 8, wherein the buffer circuit is a source follower.

13. An operation method of a low-dropout regulator, comprising:

operating, by an amplifier circuit, based on an input voltage, and generating, by the amplifier circuit, a first voltage at a first node according a reference voltage and a feedback voltage;

generating, by a buffer circuit, a second voltage at a second node according to the first voltage;

controlling, by a first capacitor in a control circuit, a first transistor in the buffer circuit to control the second voltage when the first capacitor is coupled to a gate terminal of the first transistor to form a noise canceller or controlling, by a second capacitor and a second transistor in a noise cancelling circuit, the second voltage when the second capacitor is coupled between the first node and a third node and the second transistor is coupled between the second node, the third node and a voltage terminal;

generating, by a power transistor, an output voltage according to the input voltage and the second voltage; and generating, by a feedback circuit, the feedback voltage according to the output voltage.

14. The operation method of claim 13, further comprising:

controlling, by the first capacitor in the control circuit, a super source follower to control the second voltage when the buffer circuit is the super source follower.

15. The operation method of claim 14, further comprising:

controlling, by the first capacitor in the control circuit, the first transistor in the super source follower to control the second voltage, wherein the first transistor is coupled between the second node and the voltage terminal.

16. The operation method of claim 15, wherein the super source follower further comprises a third transistor, and the third transistor is coupled to the second node and controlled by the first voltage.

17. The operation method of claim 15, further comprising:

limiting, by a resistor, a current flowing through the first transistor.

18. The operation method of claim 13, further comprising:

controlling, by the second capacitor and the second transistor in the noise cancelling circuit, the second voltage when the buffer circuit is a source follower.

19. The operation method of claim 18, wherein the source follower comprises a third transistor, and the third transistor is coupled between the second node and the voltage terminal and is controlled by the first voltage.

20. The operation method of claim 19, wherein the noise cancelling circuit further comprises a resistor, and the resistor is configured to receive a bias voltage and is coupled to the third node.

* * * * *